(No Model.) 2 Sheets—Sheet 2.
J. E. HOLMES & L. N. CHARLES.
CABLE GRIPPER AND PICK-UP.
No. 386,824. Patented July 31, 1888.
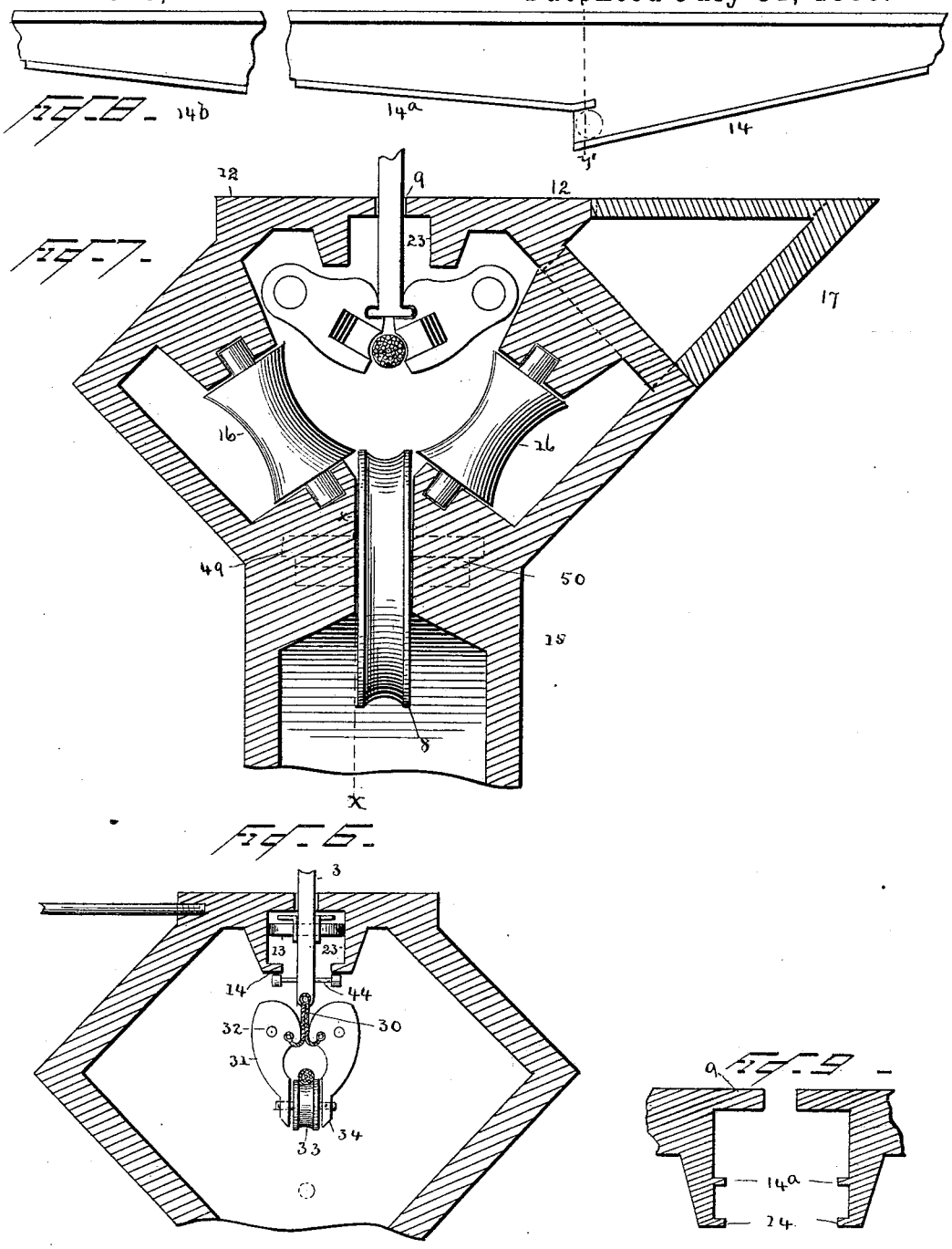
WITNESSES
Norris A. Clark
Benjamin R. Cutler
INVENTOR
Joseph E. Holmes
Lewis N. Charles

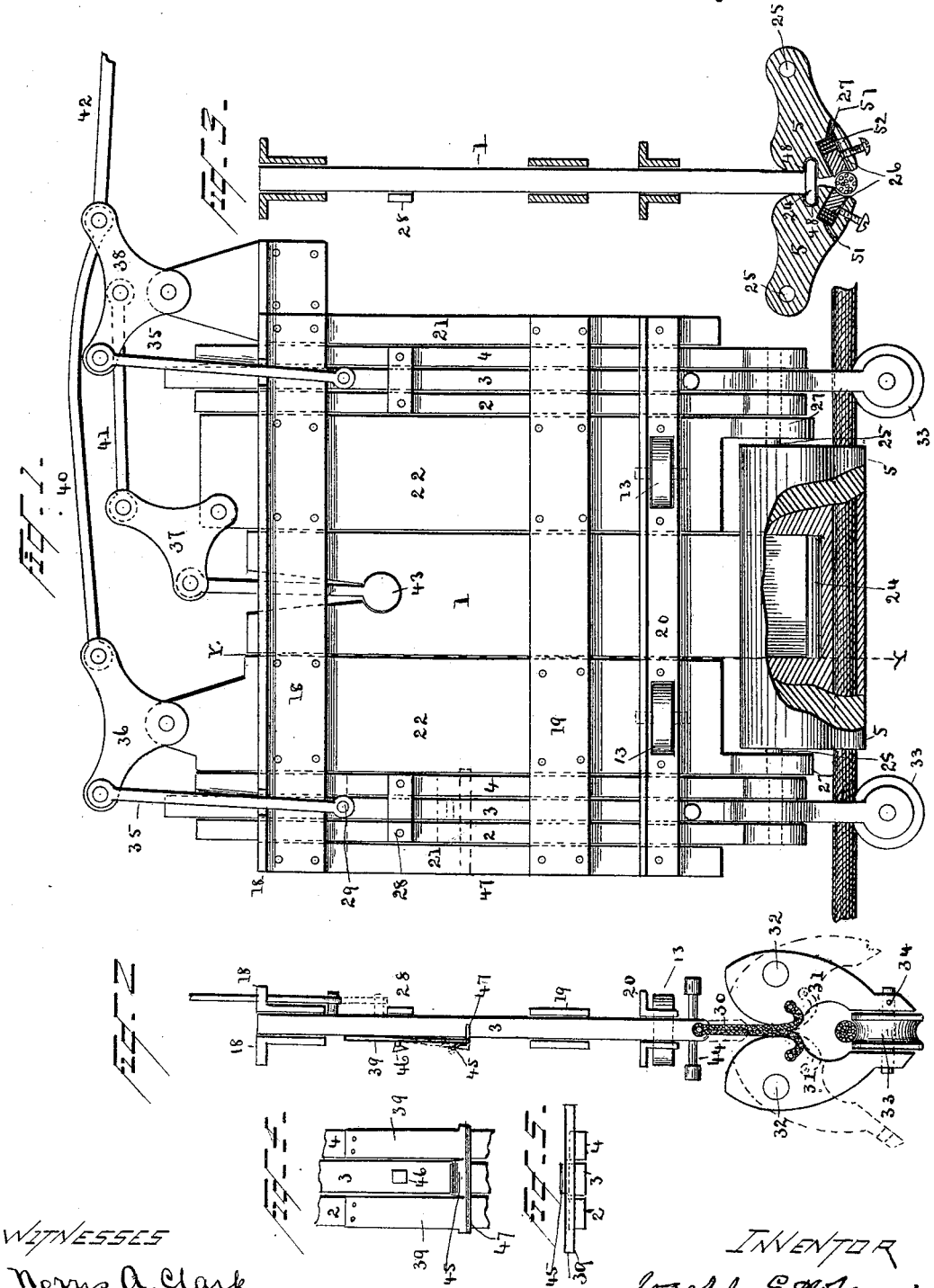

UNITED STATES PATENT OFFICE.

JOSEPH E. HOLMES AND LEWIS N. CHARLES, OF WASHINGTON, DISTRICT OF COLUMBIA, ASSIGNORS OF ONE-THIRD TO BENJAMIN R. CATLIN, OF SAME PLACE.

CABLE GRIPPER AND PICK-UP.

SPECIFICATION forming part of Letters Patent No. 386,824, dated July 31, 1888.

Application filed July 29, 1887. Serial No. 245,606. (No model.)

*To all whom it may concern:*

Be it known that we, JOSEPH E. HOLMES and LEWIS N. CHARLES, citizens of the United States, residing at Washington, in the District of Columbia, have invented certain new and useful Improvements in Underground Conduits for Cable Railways and Mechanism for Picking Up and for Gripping Cables Used in Cable-Railways; and we do hereby declare the following to be a full, clear, and exact description of the invention, such as will enable others skilled in the art to which it appertains to make and use the same.

Our invention relates to means for propelling cars by a moving cable, and its object is to produce a construction which shall combine simplicity with increased efficiency.

Among the particular results aimed at is a device which may be automatically operated to drop and pick up the cable, which device may also be operated at will, and which also may be operated in combination with a cable-gripping device in such manner as to subject the car, in making connection with the car, first to rolling friction and then to a sliding friction by means of yielding jaws or plates, and finally to a positive unyielding grip.

The invention consists in certain combinations of a conduit and cable-gripping device, of a conduit and cable-picking-up device, of a conduit and picking-up and gripping devices, and in subsidiary improvements, all as hereinafter described and particularly pointed out.

In the accompanying drawings, Figure 1 is a side elevation (partly in section) of the combined "pick-up" and grip, two of the former being represented, one at each end of the grip. Fig. 2 is an elevation looking in the direction of the length of the cable, the latter being represented in section. Fig. 3 is a section of the grip on line *y y* of Fig. 1. Fig. 4 is a plan, and Fig. 5 a bottom view, of a device for locking the inner pick-up operating bar to adjacent operating-bars of the frame. Fig. 6 is a transverse section of the conduit on a plane located between the cable-supporting wheels, showing the cable held by the pick-up and the bearing engaging beneath the flanges, as in opening the grip to drop the cable, the lowest position of the latter being indicated by dotted lines. Fig. 7 is a transverse section of the conduit in a plane passing through a cable-supporting wheel, showing the latter in full lines, and also a drain-exit, a grip, cable, and man hole, the latter being indicated in dotted lines. Fig. 8 is a side view of one lip of the conduit slot and of guide flanges or cams beneath, and Fig. 9 is a transverse section on line *y′ y′* of Fig. 8.

Our conduit is preferably made angular in cross-section, and has a slot for the passage of the grip and pick-up bars located at what would otherwise be the junction of two sides, or the upper angle, and opposite a lower angle. The walls of the conduit adjacent to the slot are widened or thickened, as indicated at 12. Below the lips 9 of the slot is provided a continuous chamber or space for the reception of a guide or bearing wheel, 13. At the bottom of this chamber, at intervals in the length of the conduit, are provided, for a purpose hereinafter to be described, flanges 14. At suitable intervals in the conduit wheels 8 are provided to support the cable when dropped by the grip and pick-up.

To provide for a larger wheel than would otherwise be practicable, the conduit has an enlargement of its interior space, as indicated at 15. The supporting-roller 8, journaled in the projections cast on the inside of the conduit, revolves partially in this space 15, which space has an exit below that may be connected with a drain or sewer. A similar effect might be produced by simply providing a slot or opening in the bottom angle of the conduit and journaling the supporting-wheel to revolve partially in such opening, a space being provided in the earth below and means for draining provided. The first-named construction is preferred.

Adjacent to the cable-supporting wheels 8 are placed guide wheels, pulleys, or rollers 16. These are journaled in suitable bearings provided on the interior of the conduit, and are arranged preferably in an inclined position and so that the curved faces of the pulleys shall be practically continuous with the curved face of the supporting wheels or rollers, substantially as indicated in the drawings. These guide wheels or rollers 16 are designed to receive and support the cable whenever it is drawn aside from the supporting-wheels 8, as may occur in a curved conduit. At such curves wheels or guide-pulleys will only be needed on the inner side of the curve, and at other points they may be dispensed with, though their use will insure the certainty of a return of the cable to the supporting-roller whenever it is free to fall by gravity. These guide rollers, in combination with supporting-rollers and ways in the body of the conduit to act in combination with a fending device on the operating-bar of the grip, are not of our invention. Were it not for these rollers or equivalent devices, the cable would be liable to be drawn against the wall of the conduit at the curves thereof, producing a grinding, destructive action, and would tend to interfere injuriously with the normal action of the grip-operating levers.

Adjacent to the supporting and guide wheels, at different points in the line, are made manholes 17, to give access to all the parts and to the grip and pick up when they are in the vicinity, and to enable the way to be readily freed from dirt. The wheels and pulleys are made removable in any well-known manner, as by slots extending from the journal-bearings in an upward direction, which will permit the journals to be dropped into place or removed therefrom.

In the drawings dotted lines at 49 indicate a slot in the casting opening toward the farther side of the wheel and toward the manhole, and 50 indicates a continuation of this slot down to the journal-bearing. The wheel 8 can be introduced through the manhole, which may, if desired, be made oblong and elongated in the direction of the length of the conduit, and the journal of said wheel can be placed in the slot 49 and passed downwardly at 50, so as to rest in its bearings.

The conduit-sections are provided with any well-known means for securing them together longitudinally, such as transverse exterior flanges provided with bolt-holes to allow the sections to be bolted or riveted together.

The upper part of the conduit may, in practice, be secured, especially in the colder sections, against the action of water when freezing and expanding in the production of ice, in any approved manner, as by bolts extending from the upper part of the conduit adjacent to the slot to the rails of the track on either side, or to any fixed points.

The gripping device herein set forth is supported by a frame secured in any suitable manner to a fixed part of a car—as, for example, to the car-axles. As shown, the frame consists of three pairs of plates, 18 19 20, (two of which are preferably angle-irons, as indicated,) bolted or riveted to and on opposite sides of vertical bars 21 22. The transverse bars may be removably secured together, and it is especially desirable that the bars 20 may be so united as to admit of being easily taken apart for the insertion or removal of wheels 13. These wheels are placed in slots provided in the vertical and transverse bars 22 and 20, and are provided with short journals which have bearings in recesses in bars 20 and 22, as indicated in dotted lines in Fig. 1. These recesses are slots extending transversely entirely through the fixed bar 22, and the ends of the axis are passed sidewise into these slots before the frame is bolted together. The wheel and its axis having been put in position and the cross-bars 20 bolted to the frame wheel 13 will be supported in the frame, those parts of cross-bars 20 which are adjacent to the opening cut in the same for the passage of the wheel laterally serving to prevent sidewise movement of the axis, which may be made as large in diameter as the thickness of the bar 22, which will be, however, limited by the width of the conduit-slot. The width of the cross-bar and the length of the axis may, however, be varied. In this respect the proportions represented in the drawings would be operative, though greater relative width of the bar 20 and increased width of the parts adjacent to the slot in the same would contribute to increased strength and durability.

As indicated in Fig. 6 of the drawings, the wheel 13 may be located sufficiently far below the conduit-slot to obviate any necessity that the axis of the wheel should enter said slot; and it will also be apparent that the horizontal flanges of bar 20 would furnish a strong support or bearing laterally, in which direction it will be most required.

Instead of entering the wheel and its axis, as above set forth, the upper opening or slot in bar 22 may be made long or deep enough to allow the wheel and axis to be raised sufficiently to permit the lower end of the axis to drop into a suitable bearing, as will be readily understood.

It is further evident that the thickness of bar 22 of the frame may be considerably increased below the slot, since this bar has no vertical movement.

The function of wheels 13 is to prevent the operating-bars 1, 2, 3, and 4 from coming in contact with the lips 9 of the slot, and they are so placed that they will bear upon wall 23 before the operating-bars come in contact with the slot-lips, thereby preventing injurious friction at that point and maintaining the perpendicularity of the operating-bars.

We are aware that it has been before proposed to provide a bearing for guide-wheels immediately below the lips of the slot; but the present improvement utilizes one wheel to fend the bar from the slot-lip on either side, and includes the matters hereinafter particularly pointed out.

Guide-wheels heretofore used have been journaled in lateral extensions of the vertical bar that passes through the slot, and not directly in the bar. Our improvement consists in dispensing with these extensions and providing journal-bearings in the bar itself. As the frame is separable by reason of its bolt-connections, this wheel is removable. This construction provides, therefore, for the use of a single removable wheel comparatively large in size and with sufficient bearings. In the preferred form it is located in two cross-bars, in which are cut openings or slots to receive the wheel. It is important that this wheel and its bearings be as large and strong as practicable, and that it be made replaceable when worn. It serves a very important purpose in keeping the bar from contact with the lips of the slot at all times. Thus, for example, when for any reason the cable is drawn to one side, as in passing through a curved conduit, this wheel resists the action of the cable tending to draw the grip bar to one side, and it therefore co-operates with wheel 16.

The grip operating bar 1 moves freely between the angle irons or plates at its sides and the fixed bars 22 at its edges. Its lower end is provided with an enlargement or head, 24, which engages slots in the grip-levers 5, pivoted at 25. The shape of this head and the corresponding recesses in the levers may be varied without substantially affecting the construction, which is designed to dispense with pivoted connecting levers heretofore used and provide a more simple and durable means of imparting motion to the levers. The raising or lowering of the bar 1 revolves the levers on their pivots and opens or closes the jaws 26. These pivots may be fixed to the grip-levers or to the extensions 27 of the bars 22, and the bearings of the pivots provided in the opposite parts. The parts are arranged substantially as shown, so that the pivots 25 and the head 24 will be in or very nearly in a horizontal line when the jaws have approached sufficiently near to give a final grip to the cable. It is obvious that this construction provides for giving a most powerful pressure, and uses a mechanical principle similar to that of the toggle-lever commonly used in presses. To provide against too sudden pressure upon the cable before the inertia of the car has been overcome, the jaws 26, which are separate pieces inserted in suitable slots or pockets, are provided at the back with elastic plates of vulcanized rubber or similar material, or with metallic springs, (indicated at 52 in Fig. 3.) For this purpose we preferably employ rubber plates hardened more or less, alternated with metallic plates, to prevent adhesion of the rubber plates. Other forms of springs, however, may be used with good effect.

The removable jaws above described may be made of any suitable metal, such as very hard iron, or they may be made of alloys. They are held in place by screws entering elongated slots in them, or other means which will allow a slight movement with and against the springs and also admit removal, and their wear can be compensated for by the insertion of additional metal or metal and rubber plates behind them. Apertures 51 are provided to aid in the removal of the springs when desired. This can be effected by withdrawing the set-screw and pushing the springs or plates and jaw out of the socket by means of any suitable instrument inserted in an aperture, 27.

The pick-up is supported by the same frame that supports the grip and in similar manner. Its operating-bar 2 3 4 is composed of three parts, of which the two outer are secured together by a cross-piece, 28, fastened to the same, as indicated.

The inner part of the pick-up bar has an independent vertical movement to the extent of the distance between the plate 18 and the piece 28, which constitutes a stop. By this means it is provided that this part may be lowered together with the connecting-chains 30, secured to the lower end of said part 3, with the effect to revolve the pivoted arms 31 about their journals or pivots 32, having bearings in the enlarged lower ends of bars 2 4, and open the pick-up jaws to drop the cable. To permit this, the cable-bearing wheel 33 has an axis or journal fixed to one of the arms 31, as at 34, and loosely entering the other arm 31, so that when the arms are rotated about their pivots 32 the axis freely escapes lengthwise from its bearing in one of the arms. As soon, however, as the wrist-pin 29 strikes the cross-piece or stop 28 all three parts of the bar 2 3 4 descend together and the arms 31 and wheel 33 are carried down, the former being open and in condition to close and carry wheel 33 under the cable at its lower point and cause the free end of the axis of the wheel to enter its bearing in the other arm 31. This latter operation is effected by raising part 3, which in this position has an independent upward movement, by means of connecting-rod 35 and its lever or by means of the automatic device aforenamed, so that wrist-pin 29 is carried up from bar 28, the parts 2 4 remaining stationary until the pick-up arms are closed. The continued upper movement of rod 35 then moves all the parts 2 3 4 and the arms and the wheel supporting the cable until the cable is carried into the open jaws of the grip and is pressed against them.

Heretofore in a compound bar for operating a pick-up two parts have been connected by a pin on one entering a slot in the other, the independent movement of the part carrying the pin being limited by the end walls of the slot. Our construction obviates the necessity of the slot, which necessarily weakens the bar, and also obviates the use of an independent pin by utilizing the wrist-pin of the connecting-lever. Our improvement is further characterized by the fact that the pick-up does not grip the cable and become thereby worn, but in use carries a supporting pulley or wheel under and providing for the support of both journals of said wheels in such position.

The above-described independent movements of the part 3 would ordinarily occur under the conditions set forth; but to render entirely certain that parts 2 and 4 shall rest when desired during a small downward movement of 3 to open the pick-up a spring-catch is provided, which automatically locks and unlocks the parts at the desired point and time, so that accidental and untimely movement of the parts 2 4 is positively prevented. This locking device is represented in Figs. 2, 4, and 5 and indicated in dotted lines in Fig. 1. Springs 39 are secured to the exterior parts 2 4 of the pick-up bar and their free ends connected by a plate which is normally held against the bar, and which is provided with flanges 47, that engage with slots in bars 21 22. On part 3 is secured a pin, 46, with an inclined face adapted to strike a corresponding incline, 45, provided on the connecting-plate above referred to, with the effect to press the plate and springs outwardly and disengage flanges 47 of the connecting-plate from the slots in fixed bars 21 22, in which they rest when preventing the movements of parts 2 4. This descent of the pin 45 occurs when the pick-up is being opened, and at this time the catch or lock is released to allow the parts 2 3 4 to move together as soon as the wrist-pin 29 engages bar 28, (the pick-up being then open.) to carry down said pick-up, as before described. A similar spring-catch might be arranged in a reverse position to prevent the accidental upward movement of the parts 2 4 at the time that 3 is ascending to close the pick-up; but it is not necessary, for the reason that the weight of parts 2 4 is sufficient to keep them stationary at such time until the ascent of part 3 has closed the arms and the pull of part 3 and the chain is imparted to all the parts 2 3 4. The parts are preferably so arranged in construction that the rising of the wheel 33 shall press the cable against the grip-jaws and compress or partially compress the springs behind the jaws, whereby a rolling friction occurs on the under side of the cable and a sliding friction with a yielding surface on the upper side.

Heretofore a spring friction device attached to the pick-up bar has been used for an analogous purpose, such spring being curved at its bearing end to enter a curved depression in a fixed bar, out of which depression the spring was drawn over the inclined or curved surface of the depression. Such device does not act to securely lock the parts together, there being no independent releasing and locking devices—such as our flanges 47—positively engaging slots at right angles to the direction of the movement of the bar and the independent releasing devices 46 and 45.

The construction is preferably such that the grip can be operated by means of the pick-up, provided the latter is arranged so that its upward movement is arrested by the cable forced against the grip-jaws. To provide for such an effect the rod 35 is pivoted to bar 3 at such point that the movement of the bell-crank 36 about its pivot will raise the upper surface of the pick-up wheel 33 slightly above a plane longitudinal to the lowest part of the cable when held firmly in the grip, and when the particular arrangement of bell-cranks shown in the drawings are used and the above-described effect is desired they should severally be so pivoted that the closing of the grip shall not occur until the cable is carried in contact with the grip-jaws and pressed against the same. This pressure of the cable against the jaws moves the grip-levers about their pivots 25, and may compress the jaws upon the cable with force sufficient to start a car and maintain connection between the car and moving cable, even though lever 37 and rod 41 are omitted. This operation obviously requires that the pick-up and its operating devices should be so proportioned and arranged as to be capable of carrying the cable against the grip-jaws and slightly raising the grip-levers 5 by moving them about their pivots 25. For this operation two pick-ups, one on each side of the grip, are preferable. The grip, however, may be directly operated by any well-known means. We have illustrated one preferred arrangement and construction which embraces bell crank levers 36 37 38 and their connections, substantially as shown. These levers are pivoted to fixed parts of the frame and are connected by rods 40 41, so that they move together when operated by the rod 42, to which power is applied. Lever 37, however, by means of rod 41, is pivoted to 38 near its center, as shown, so that the movement of lever 37 is comparatively small, it being necessary to move bar 1 only a sufficient distance to open and close the grip, while 36 and 38 have a larger movement, as it is necessary that the pick-up bars should move a sufficient distance to open and close the pick-up arms, and also to lower and raise them.

At 43 is represented a simple and effective mode of securing the connecting-rod to the bar 1. The head of said rod is inserted in a suitable bearing before the plates 18 are fastened together. The bar 1 is cut away, as indicated in Fig. 1, to allow lateral movement of the rod. The connecting-rods 35 are connected to the pick-up bars by wrist-pins outside of the plates 18, the flanges of the plates being cut away to allow the necessary lateral movement of the rods.

The parts being in position illustrated in Fig. 1, a movement of the lever 42 toward the left will cause the descent of the bars 3 and 1 with the effect to open both the grip and pick-ups and drop the cable. A continuance of the movement lowers the pick-ups and opens the grip a little wider. The open position of the pick-up arms is indicated in dotted lines in Fig. 2. In practice these arms will not usually be opened as wide as indicated, a comparatively small lateral movement of each arm being ordinarily sufficient. A reverse movement closes the pick-up under the cable and begins to close the grip, and a continuance of the movement raises the pick-up, carries the cable into the grip, and closes the latter. Preferably we arrange the parts so that the pressure of the rising cable shall co-operate with the ascending bar 1 to grip the cable, and this arrangement provides an initial rolling friction on the pick-up wheels, accompanied or quickly followed by sliding friction against the yielding jaws and then by a final and positive grip.

For automatically operating the pick-up we may use the following means: A cross-bar, 44, is secured to bar 3 and provided at its end with friction-rollers arranged to engage flanges 14 beneath the conduit-slot at points in the length of the conduit where it is desired to automatically drop and pick up the cable, as in crossing over another cable. Looking at Fig. 8 and supposing the car and pick-up to be moving to the right, the friction-rollers are to be supposed to be so placed that they will engage with the under side of flanges $14^b$, one on each side, and the bar 3 will consequently be forced down as the rollers move to the right under said flanges. This opens the pick-up and connected grip and drops the cable. At a sufficient distance in the length of the conduit to allow the mechanism to be carried over the cross-cable or other obstruction, other flanges, $14^a$, are provided underneath, which the rollers engage, and the pick-up is thereby carried down to the cable just before dropped. Flanges 14 receive the rollers on their upper faces with the effect to pick up and raise the cable and close the grip.

The various devices above described will operate practically if constructed proportionally as represented, although the invention is not limited to the exact proportions shown.

In practice the conduit can be made about twelve inches square on its exterior, and its walls are to be made sufficiently thick to enable them to withstand considerable pressure. The strength of the conduit can be easily increased, if desired, by casting transverse webs or braces in the lateral angles in a well-known manner. The cable-supporting wheels can be made eight or ten inches in diameter and me- ployed in any desirable number.

Preferably the operating bars and frame are to be made of good steel. The grip and picking-up arms can be made of cast-iron. Suitable outlines for these arms are indicated. Each grip-arm preferably has a face conforming to the arc of a circle described from the axis or center of motion of the arm, and these arms are placed as close as practicable without interfering with the operating-bar.

The chains that operate the picking-up arms are preferably made of braided steel wire. They have considerable elasticity, and will operate efficiently in opening and closing the arms. Several of these placed side by side are secured in any convenient manner to the operating-bar and to each picking-up arm. The latter connection is effected by casting or otherwise forming a transverse slot in the arm, into which the ends of the chains are thrust and secured by a transverse pin.

As a convenient means of attaching the grip-frame to a car, two rods or bars can be secured to the axles at a distance apart that will allow the frame to be inserted between, and the flanges of the plate 18 bolted or otherwise secured thereto. The bell-crank levers and connecting-rods will be below the car-floor and the rod 42 will extend to the rear or front of the car, or be so connected with levers or other devices as to be operated from either or both ends of a car. Such mechanism is well known and need not be further described.

Although we have described a conduit, pick-up, and grip that co-operate and are specially adapted to each other and are to be used in one organization, yet in respect to the several improvements hereinafter pointed out, which are capable of use in other combinations, we do not desire to be considered as limited otherwise than as specified.

It is obvious that the picking-up device could be used with another grip, and vice versa, and also that there are some improvements in each of these that in practical use need not be confined to the particular conduit.

It is also to be understood that we do not limit our invention to this particular arrangement of pick-up and gripping devices as illustrated, as there may be one pick-up and two grips, one of the latter on each end of the former, or but one grip and one pick-up.

Our pick-up could be operated if one arm were dispensed with. In such case the lower end of the single arm should be provided with a wheel having a groove sufficiently deep to securely hold the cable when resting on the same, and preferably should be journaled on both sides in the arm, the latter being extended for this purpose. We prefer, however, to use two arms, as above described.

The chains as described constitute our preferred means for connecting the operating-bar with the pick-up arms; but flexible metal straps could be employed, and some parts of our improvements in the picking-up device could be used by substituting a rack-bar for the chains, the inner faces of the arms being provided with the teeth to gear with the bar, and gripping-arms could be operated in a similar manner without sacrificing all the advantages of our improvements in this part of the mechanism; but we prefer the means illustrated and described, which combine great simplicity with strength and certainty of action.

Having thus described our invention, what we claim, and desire to secure by Letters Patent, is—

1. The combination of a conduit provided with flanges or cams, a picking-up device provided with a bearing to engage said cams, and a gripping device with pivoted jaws adapted to be closed by the forcing of the cable against the same, substantially as specified.

2. The combination of a conduit provided with cams or flanges, a picking-up device consisting of movable jaws or parts and provided with a bearing to engage the cams, a pivoted gripping device, supporting and operating parts of the picking up device arranged with reference to the gripping device to lift the cable slightly above the latter, and the cable, substantially as set forth, whereby the cable may be automatically picked up and forced into the jaws of the gripper to close the same.

3. The combination of a conduit provided with cams or flanges, a picking-up device consisting of movable parts or jaws carrying a cable-supporting wheel and provided with a bearing to engage the cams, pivoted gripping-jaws, supporting and operating parts of the picking-up device arranged with reference to the gripping device to lift the cable slightly above the latter, and the cable, substantially as set forth, whereby the picking-up device may be automatically operated to receive and sustain the cable upon a wheel and force it again against the jaws to close the same.

4. The combination of the conduit, a cable, the picking-up device, the gripping device embracing pivoted toggle-levers, their vertical bars supported to move in the slot of the conduit, an operating-lever connected to the vertical bar of the picking-up device to move the wheel of the pick-up above a plane tangential to the lower surface of that part of the cable which is adjacent to or in the grip, to lift the cable and close said grip, and operating devices, substantially as set forth, whereby the cable may be dropped by both picking-up and gripping devices, and the cable subsequently picked up and forced into the jaws of the gripping device to close the same.

5. The combination of the conduit provided with ways immediately below the lips of the slot, and the friction-wheel 13, journaled in the fixed bar 22 of the frame between bars 20, and arranged to engage a way on either side, according as the bar is inclined to one side or the other, substantially as specified.

6. The combination of a curved conduit provided with ways immediately below the lips of the slot, the wheel 13, journaled in the fixed bar 32 of the frame between bars 20 and arranged to engage a way on either side, according as the bar is inclined, the cable, and guide-wheels, substantially as specified, whereby the cable may be kept from contact with the wall of the conduit at curves or elsewhere and the bar be kept in vertical position.

7. The arms of the gripping devices provided with removable jaws and with springs, and having openings in the jaw-holding arms for inserting a tool to remove the springs, substantially as specified.

8. The combination of the picking-up device and its cable-supporting wheel, the pivoted gripping levers or arms having jaws movable in their seats, springs located behind said jaws, and operating mechanism whereby a cable may be pressed by the wheel against yielding jaws and finally receive an unyielding grip, substantially as specified.

9. A cable-gripping apparatus having gripping-levers, one of which is provided with a socket, and a removable gripping-jaw and removable plate in said socket, substantially as specified, whereby the wear of the jaws may be compensated for by the introduction of plates into the socket behind the jaw.

10. The combination of the pivoted arms 5, of the gripping device provided with notches or recesses 48, the operating-bar provided with the head 24 to engage in the recesses of the pivoted arms, and mechanism for raising and lowering the operating-bar to close or open the gripper, substantially as specified.

11. The combination of the arms of the picking-up device, pivoted as shown, the chains secured to said arms, and mechanism for raising and lowering the chains, substantially as set forth, whereby the arms may be opened and closed.

12. The combination of the operating-bar, of the picking-up device made in parts, the spring-catch, the frame, the pin to disengage the catch, the pivoted arms, and the operating mechanism, whereby a part of the operating-bar may be moved to open the picking-up arms while the other parts of said bar are locked, substantially as specified.

13. In a device for picking up a cable, a compound operating-bar, the parts of which are made separately movable, combined with an automatically-acting locking device adapted to lock one member of said compound bar to the frame, and said frame, said locking device having a flange substantially at right angles to the bar and a distinct releasing device, substantially as specified, whereby a positive locking together of the parts may be effected and independent movement provided for at times desired.

14. In a device for picking up a cable, the cable, a compound bar having an independently-movable part, a lever connected to said part, a stop secured to another part to limit the separate movement of said independently-movable part, pivoted arms, and a cable-supporting wheel having an axis secured in a bearing in one arm and free to enter or leave a bearing in the opposite arm, substantially as specified, whereby the gripping device may be vertically moved whether open or closed, and whereby the wheel and axis may be swung beneath the cable and the axis supported at each end when the cable is on the wheel.

15. The combination of the picking-up and gripping devices and their operating-bars, bell-crank levers, a rod connecting the levers, and rods connecting the levers and the operating-bars, the rod between the grip-bar and its corresponding lever being pivoted nearer its center of motion than the rod between the picking-up bar and its lever, whereby the operating-bars can be moved simultaneously but at different rates of speed, substantially as specified.

16. The combination of an operating-lever, bar 1, a gripping device, the connecting-rod 43, provided with a head and cross-bars, as 18, substantially as specified, whereby the operating-lever and the grip-sustaining bar are connected for operation.

In testimony whereof we affix our signatures in presence of two witnesses.

JOSEPH E. HOLMES.
LEWIS N. CHARLES.

Witnesses:
JOHN T. MITCHELL,
BENJ. R. CATLIN.